United States Patent [19]

Chonde

[11] Patent Number: 4,537,911

[45] Date of Patent: Aug. 27, 1985

[54] INTERFACE BEADS FOR MIXED-BED ION EXCHANGE RESINS

[75] Inventor: Yohannes Chonde, Midland, Mich.

[73] Assignee: The Dow Chemical Company, Midland, Mich.

[21] Appl. No.: 570,561

[22] Filed: Jan. 13, 1984

[51] Int. Cl.³ .............................................. C08D 5/20
[52] U.S. Cl. ................................... 521/28; 526/287; 526/328.5; 526/329.2
[58] Field of Search ................. 521/28; 526/274, 287, 526/317, 328.5, 329.2

[56] References Cited

U.S. PATENT DOCUMENTS

| | | | |
|---|---|---|---|
| 3,211,782 | 10/1965 | Rabinowitz | 526/274 |
| 3,944,637 | 3/1976 | Bond et al. | 526/317 |
| 4,065,522 | 12/1977 | Myers et al. | 526/287 |
| 4,151,332 | 4/1979 | Chong et al. | 521/28 |
| 4,280,003 | 7/1981 | Herbin et al. | 521/31 |

*Primary Examiner*—Joseph L. Schofer
*Assistant Examiner*—Peter F. Kulkosky

[57] ABSTRACT

Improved beads for use in the interfacial separation of anion and cation exchange beads are spherical, hydrolytically stable polymer beads having a controlled particle size, controlled density and a water wettability. The beads comprise a hydrophobic monomer, a hydrophilic monomer and a crosslinking monomer. The interface beads allow for the preparation of mixed-bed exchange resin compositions having improved life cycles and improved resin efficiencies.

19 Claims, No Drawings

INTERFACE BEADS FOR MIXED-BED ION EXCHANGE RESINS

BACKGROUND OF THE INVENTION

This invention relates to ion exchange resins, and in particular to mixed-bed ion exchange resins.

Mixed-bed ion exchange resins are well-known to be simple mixtures of the beads of an anion exchange resin with those of a cation exchange resin. When water of another liquid containing dissolved salts flows through a mixed-bed resin, the cation exchange beads exchange hydrogen ions for dissolved cations in the liquid, and the anion exchange beads typically exchange hydroxide ions for dissolved anions. This process normally continues until the available hydrogen or hydroxide ions of the resins have all been exchanged, whereupon these ions must be replaced via the process known as regeneration.

Cation exchange resins are normally regenerated with aqueous solutions of acids, while anion exchange resins are normally regenerated with aqueous solutions of bases. Exposure of the cation resin to the cations of the anion resin regenerant, or of the anion resin to the anions of the cation resin regenerant, would effectively prevent or reverse regeneration, so the resins are typically segregated prior to regeneration. The cation and anion resins are selected with sufficiently different backwash flotation rates, resulting from their densities and bead diameters, that classification of the resin bed by passing water upward through it causes vertical segregation of the two resins within the ion exchange column. Regenerants are then caused to flow within their respective separated resins.

It is well known to increase the thickness of this interface between the two resins by including a third, inert material in the mixed-bed resin composition, which during the ion exchange treatment process is intimately mixed with the ion exchange resins, but which, because of its backwash flotation rate intermediate between those of the cation resin and the anion resin, settles between these two resins during classification prior to regeneration. As disclosed in U.S. Pat. No. 2,666,741, this separation of the cation resin from the anion resin before regeneration allows placement of liquid inlets and outlets between them, reduces the chance of the regenerant for one resin working its way into the other resin, and allows for a reduction in bed size caused by attrition of the resins. In addition, such generation processes are not currently popular.

The spacer materials, which have been useful, typically appear neutral with respect to ion exchange properties. That is, the spacer materials appear ionically neutral, having neither reactive acidic nor basic functional ion exchange sites, and have a backwash flotation rate intermediate between those of the anion and cation resins. For practical considerations, it is helpful if the density of the spacer material approaches a value intermediate between the densities of the two ion exchange resins, so that its particle size and shape may be similar to that of the resins. The spacer material should be at least as physically stable as the ion exchange resins in order that shrinkage of the separation zone does not require addition of spacer material before replacement of the resins. The spacer material must also be resistant to attack by the influent stream and by the regenerants, which are usually solutions of strong acids and strong bases.

Materials which have been used by others as an inert spacer between the anion resins and cation resins during regeneration include beads or particles of polystyrene, polyvinyl chloride, polyethylene and hollow glass spheres. Unfortunately, said spacer material has a tendency for them to aggregate with particles of the anion exchange resin, thus causing the backwash flotation rate of both the resin and the spacer material to be changed. When this occurs, backwashing fails to sharply classify the materials in the ion exchange bed, and the subsequent regeneration is less efficient and less complete. Another problem is the coglomeration or agglomeration of beads caused by trapped gases between beads during backwash. Such a problem causes beads to "float", thus failing to provide a sharp classification of materials in the ion exchange bed.

Mixed-bed ion exchange resin compositions are disclosed in U.S. Pat. No. 4,151,332. Such compositions comprise particles containing in polymerized form, relative large amounts of a hydroxyalkyl methacrylate monomer. Unfortunately, such particles are prepared using polymerization techniques which can yield wide particle size distributions which lower their effectiveness after several regeneration processes. In addition, the relatively large amount of hydrophilic hydroxyalkyl methacrylate monomer which is employed can provide a tendency for the particle to be not water wettable and thus can cause cross contamination of anionic and cationic beads.

In view of the deficiencies of the prior art, it would be highly desirable to provide a particulate spacer material for separation of mixed bead ion resin interfaces, which particles have excellent settling properties when subjected to backwashing, no titratable ionic moieties, and good physical properties.

SUMMARY OF THE INVENTION

The present invention is a bead for a cation and anion mixed-bed ion exchange resin composition, which bead is an essentially spherical, hydrolytically stable polymer bead having a controlled particle size, a controlled density and a water wettability, wherein said bead comprises the polymerization product of a major amount of at least one monoethylenically unsaturated hydrophobic monomer, at least one polyethylenically unsaturated monomer, and minor amount of a monoethylenically unsaturated ionizable hydrophilic monomer such that said bead does not exhibit a significantly titratable amount of hydrophilic moieties.

The particles of this invention allow the skilled artisan to prepare improved mixed-bed ion exchange resin compositions comprising particles of an anion exchange resin, particles of a cation exchange resin, and particle beads of this invention wherein the particles of this invention have a backwash flow rate intermediate between that of the anion exchange resin particles and that of the cation exchange resin particles. Specifically, the interface particles of this invention exhibit excellent settling properties and do not aggregate causing flotation problems during backwashing. The use of particle beads of this invention allows the skilled artisan to provide a process for the effective separation of anionic and cationic exchange resins while preventing the cross contamination of such resin particles during regeneration. The use of the particles of this invention allow the skilled artisan to perform a process for preparing improved mixed-bed exchange resin compositions having improved life cycles and improved resin efficiency.

By "controlled particle size" is meant that the size of the bead is essentially equal to that of other like beads, such that there is a narrow particle size distribution of the uniform or homogeneous sized beads as employed. Likewise, the term "controlled density" means that the density of the bead is essentially equal to that of like beads (i.e., the beads have a uniform or homogeneous density). By the term "significantly titratable amount of hydrophilic moieties" is meant that the titratable acid functionality is present at greater than 0.1 meq/10 ml of resin. By the term "water wettability" is meant that the bead can be wet by water thus preventing the accumulation of aqueous bubbles (which can cause flotation problems) at the surface of said bead.

DETAILED DESCRIPTION OF THE INVENTION

Polymers useful in the practice of this invention are crosslinked polymers formed through the addition polymerization of at least one polymerizable monoethylenically unsaturated hydrophobic monomer, at least one polymerizable polyethylenically unsaturated monomer, and at least one polymerizable monoethylenically unsaturated hydrophilic monomer.

The hydrophilic monomer is most desirably a monomer containing an ionic moiety. The ionic moieties can be either anionic or cationic, although anionic moieties are much preferred. Typically suitable anionic moieties include sulfonic acid, carboxylic acid, phosphonic acid, and the like; and salts thereof. Examples of anionic hydrophilic monomers include acrylic acid, methacrylic acid, sulfoethyl methacrylate, 2-acrylamido-2-methylpropane sulfonic acid, styrene sulfonic acid; and salts thereof, as well as hydrolyzed vinylbenzyl chloride. Less preferred monomers such as hydroxyethyl methacrylate and hydroxyhexyl methacrylate, can also be employed in addition to the aforementioned hydrophilic monomers. However, it is desirable to keep monomers such as hydroxyethyl methacrylate to a minimum because such monomers are nonionic in character and the density of beads formed using such monomers is not desirable. Suitable cationic moieties typically include amines, ammonium moieties, phosphonium moieties, sulfonium moieties, and the like. Exemplary cationic moieties include $-NH_2$; $-N(CH_3)_2$; $-N(CH_3)C_2H_4OH$; $-N(CH_3)_3^{\oplus}$; $-N(CH_3)_2C_2H_4OH$; and the like.

The hydrophobic monomer is most desirably one that when polymerized, yields an essentially water-insoluble polymer. Such monomers include the monovinylidene aromatics such as styrene, vinyl naphthalene, and the like. Also included are the alkyl substituted styrenes such as vinyltoluene and ethylvinylbenzene. Halo-substituted styrenes such as bromo- or chlorostyrene are included. Also included are the halo olefins such as the vinyl halides (e.g., vinyl chloride). Particularly useful are the esters of $\alpha,\beta$-ethylenically unsaturated carboxylic acids, such as methylmethacrylate and ethylacrylate. Monomers such as vinyl acetate can be employed.

Polyethylenically unsaturated monomers are the polyvinyl monomers useful in preparing ion exchange resins and include monomers such as divinyl benzene, divinyl toluene, divinyl xylene, and divinyl napthalene; ethylene glycol dimethacrylate; trimethylol propane triacrylate; divinylsuccinate; and the like.

The seed bead is a monomer swellable, spheroidal bead of a polymer derived from a monoethylenically unsaturated hydrophobic monomer and a crosslinking agent therefor, which crosslinking agent is preferably a polyethylenically unsaturated monomer. Typically, the hydrophobic monomer is styrene or methylmethacrylate. The seed bead is most desirably prepared by polymerizing the desired hydrophobic monomer or mixture of monomers with the desired polyethylenically unsaturated monomer such that the amount of polyethylenically unsaturated monomer is present in an amount from about 0.1 to about 2 weight percent, based on the weight of total monomer forming the seed. Such seed beads are preferably monodisperse in nature (i.e., all seed particles are of essentially the same diameter). The seed beads are prepared using techniques known in the art. For example, seed beads can be prepared by a conventional batch suspension process wherein the particle size is determined by agitation rate and the suspending agent which is selected. Alternatively, the seed bead can be prepared by the polymerization of ultrasonically generated monodispersed monomer droplets as disclosed in U.S. patent application Ser. No. 398,007 filed July 14, 1982, now U.S. Pat. No. 4,444,961, which is incorporated herein by reference.

Most desirably, beads of this invention are prepared by seed suspension polymerization techniques. For example, a seed bead is swollen with a hydrophobic monomer and polyvinyl monomer mixture and subjected to polymerization conditions. The hydrophilic properties of the resulting bead are provided to the surface of the bead by introducing a desired amount of hydrophilic monomer into the reaction mixture before polymerization is complete. This method is preferred over the preparation of a bead which is prepared and subjected to surface hydrolysis. Factors such as seed bead particle size, ratio of seed bead to monomer mixture, and the like will affect the final bead particle size and density.

The amount of polymerizable monomer relative to the seed bead can vary. Typically, the amount of monomer relative to the amount of seed which is employed ranges from about 3:1 to about 6:1, based on the weight of each of the species. Such a mixture typically yields a final bead having a diameter which is about 1:5 to about 2 times that of the seed bead. Although the beads can be prepared in a wide range of sizes, the preferred beads range from about 75 micrometers to about 2 mm in diameter. Such final beads typically have a wet density ranging from about 1.14 to about 1.19 gm/ml, preferably about 1.15 gm/ml.

The monomer mixture which is employed can vary depending upon factors such as the density of the bead desired, the seed bead which is employed, the type of hydrophilic monomer which is employed, and the like. Typically, the amount of hydrophobic monomer can range from about 89 to about 99 weight percent based on the total weight of all monomers. The amount of polyvinyl crosslinking monomer can range from about 0.05 to about 10 weight percent based on all monomers. The amount of hydrophilic monomer can vary and can typically range from about 0.1 to about 8 weight percent, preferably from about 0.1 to about 6, most preferably from about 0.1 to less than about 5, weight percent based on all monomers.

The amount of hydrophilic monomer which is employed varies with the type or character of monomer. For example, a more hydrophilic monomer can be employed in a smaller amount than a less hydrophilic monomer. For example, methacrylic acid can be employed in an amount ranging from about 1 to about 6, preferably about 4 to about 5, weight percent based on all monomers. Alternatively, a hydrophilic monomer such as sodium styrene sulfonate can be employed in an amount ranging from about 0.25 to about 1, preferably about 0.5 to about 0.7, weight percent based on all monomers.

For use in a mixed-bed ion exchange column the polymer beads of the present invention are added to the mixed cation and anion exchange resins in an amount from about 5 to about 15 volume percent of the total ion exhange resin volume; the preferred amount is about 10 volume percent. The particle size of the polymer beads is chosen to give a backwash flow rate intermediate between that of the anion exchange resin and the cation exchange resin. See for example, the teachings in U.S. Pat. No. 4,151,332. The polymer beads are mixed with the ion exchange resins during the loading of the column. The beads separate to form the interface separator zone during backwashing, and are remixed with the ion exchange resins for the next cycle.

The resistance of the polymer beads of this invention to clumping or aggregation with anion exchange resins is thought to relate to the presence of the hydrophilic monomers which provide good surface wettability. Because the amount of hydrophilic monomer is very small relative to the amount of hydrophobic monomer and crosslinking monomer, there is no significant ion exchange capacity. In addition, the extremely low amount of hydrophilic monomer which is present in the bead does not introduce a tendency to swell to the bead. Furthermore, the extremely low amount of hydrophilic monomer provides increased resistance to chemical attack, and increased resistance to osmotic shock caused from expansion and contraction during regeneration.

The following examples are presented to further illustrate but not limit the scope of this invention.

EXAMPLE 1

Into a 3-liter jacketed stainless steel reactor is charged 800 g distilled water and 200 g polystyrene seed bead which is 0.3 percent crosslinked using divinylbenzene and has a 400 mesh size (420 micrometer average diameter). This mixture is agitated for 10 minutes. A mixture of 974 g methylmethacrylate, 47 g divinylbenzene, 1 g tertiary butylperoctoate and 0.6 g tertiary butylbenzoate is added to the reactor. This mixture is agitated at 150 rpm for 30 minutes in order to allow the monomer to be imbibed into the seed beads. To the mixture is added 40 g of a 1 percent aqueous sodium lauryl sulfonate solution. Then 16 g of gelatin in 860 g water is added to the reactor. The mixture is agitated for 5 minutes. To the mixture is charged 60 g methacrylic acid in 200 g water. The mixture is agitated for 10 minutes at room temperature followed by the heating of the contents at the rate of 0.5° C./minutes until the temperature reaches 80° C. The polymerization reaction is carried out at 80° C. for 10 hours followed by polymerization at 110° C. for 3 hours. The reaction product is cooled, washed with water, and the beads are dried at room temperature.

EXAMPLE 2

A column is packed with 200 ml of beads as described in Example 1, 900 ml of an anion bead and 900 ml of a cation bead. The column is backwashed and air purged. The flow rate of backwashing water is adjusted to a 100 percent bed expansion and the extent of separation can be observed. After about 10 to about 20 minutes phase separation is obtained, no flotation of the beads as described in Example 1 is observed, and no cross-contamination of anion bead with cation bead are observed.

EXAMPLE 3

Into 50 ml of water is dispersed 20 g of bead as described in Example 1. To this mixture is added a 0.2 g of an effervescing sodium bicarbonate tablet. The mixture is stirred for 30 seconds. When bubbling ceases the amount of floating bead is determined. No bead of this invention is observed to float. Conversely, a similar amount of bead which is sold under the tradename Amberlite DP-1 ® by the Rohm and Haas Company and which is similarly treated is observed to float in the amoun of 90 percent. This indicates that the bead of this invention is much improved in resisting flotation when subjected to a gaseous phase while in use.

What is claimed is:

1. A bead for a cation and anion mixed-bed ion exchange resin composition, which bead is an essentially spherical, hydrolytically stable polymer bead having a controlled particle size, a controlled density and a water wettability, wherein said bead comprises the polymerization product of a major amount of at least one monoethylenically unsaturated hydrophobic monomer, at least one polyethylenically unsaturated monomer, and minor amount of a monoethylenically unsaturated ionizable hydrophilic monomer which contains anionic or cationic moieties such that said bead does not exhibit a significantly titratable amount of hydrophilic moieties.

2. A bead of claim 1 comprising from about 89 to about 99 weight percent hydrophobic monomer, from about 0.05 to about 10 weight percent polyethylenically unsaturated monomer and from about 0.1 to about 8 weight percent hydrophilic monomer.

3. A mixed-bed ion exchange resin composition comprising:
   (a) particles of anion exchange resin,
   (b) particles of a cation exchange resin, and
   (c) particles of the bead of claim 1 wherein the particles of the bead of claim 1 have a backwash flow rate intermediate between that of the anion exchange resin particles and that of the cation exchange resin particles.

4. A mixed-bed ion exchange resin composition of claim 3 wherein the anion exchange resin is a basic resin and the cation exchange resin is an acidic resin.

5. A composition of claim 3 wherein particles of (c) are present in an amount from about 5 to about volume percent based on the total resin volume of particles of (a), (b) and (c).

6. A bead of claim 1 which is prepared via a seed suspension polymerization technique.

7. A bead of claim 1 wherein said ionizable hydrophilic monomer contains anionic moieties.

8. A bead of claim 1 wherein said ionizable hydrophilic monomer contains cationic moieties.

9. A bead of claim 1 wherein said hydrophilic monomer is methacrylic acid and comprises from about 1 to about 6 weight percent of said bead, based on all monomers.

10. A bead of claim 1 wherein said hydrophilic monomer is sodium styrene sulfonate and comprises from about 0.25 to about 1 weight percent of said bead, based on all monomers.

11. A bead of claim 1 wherein said hydrophobic monomer is a monovinylidene aromatic monomer.

12. A bead of claim 1 wherein said hydrophobic monomer is an ester of an $\alpha$, $\beta$-ethylenically unsaturated carboxylic acid.

13. A bead of claim 12 wherein said hydrophobic monomer is methyl methacrylate.

14. A bead of claim 1 having a diameter from about 75 micrometers to about 2 millimeters.

15. A bead of claim 1 having a wet density ranging from about 1.14 to about 1.19 gm/ml.

16. A bead of claim 1 comprising from about 0.1 to about 6 weight percent of said bead, based on all monomers.

17. A bead of claim 1 comprising from about 0.1 to less than about 5 weight percent of said bead, based on all monomers.

18. A bead of claim 1 wherein the hydrophilic properties of the bead are on or near the surface of the bead.

19. A bead of claim 1 wherein said major amount of at least one monoethylenically unsaturated hydrophobic monomer comprises in polymerized form a mixture of styrene and methyl methacrylate.

* * * * *